United States Patent
Sporer

Patent Number: 6,119,046
Date of Patent: Sep. 12, 2000

[54] METHOD OF CONTROLLING A CHOPPER DRIVER AND A CIRCUIT ARRANGEMENT FOR EXECUTING THE METHOD

[75] Inventor: Norbert Sporer, Wielenbach, Germany

[73] Assignee: Deutsches Zentrum fur Luft-und Raumfahrt e.V., Bonn, Germany

[21] Appl. No.: 09/017,148

[22] Filed: Feb. 2, 1998

[30] Foreign Application Priority Data

Feb. 4, 1997 [DE] Germany .......................... 197 04 089

[51] Int. Cl.[7] .................................................. G05B 11/01
[52] U.S. Cl. ........................ 700/12; 700/292; 363/63; 318/696
[58] Field of Search .............................. 700/292, 1, 11, 700/12, 188; 327/309, 110, 423; 318/294, 376, 434, 492, 685, 696, 811; 363/63, 98; 388/811, 907.5, 916, 921

[56] References Cited

U.S. PATENT DOCUMENTS

| | | | |
|---|---|---|---|
| 3,697,852 | 10/1972 | Gerbitz | 363/21 |
| 4,491,904 | 1/1985 | Horiuchi et al. | 700/1 |
| 4,752,867 | 6/1988 | Backe et al. | 700/3 |
| 4,908,562 | 3/1990 | Back | 318/696 |
| 5,075,568 | 12/1991 | Bilotti et al. | 327/110 |
| 5,184,036 | 2/1993 | Kesler et al. | 327/51 |
| 5,428,522 | 6/1995 | Millner et al. | 363/63 |
| 5,668,493 | 9/1997 | Nelson et al. | 327/309 |
| 5,883,537 | 3/1999 | Luoni et al. | 327/318 |
| 5,920,491 | 7/1999 | Hibbitt et al. | 395/500.28 |
| 5,939,907 | 8/1999 | Miyazaki | 327/108 |

*Primary Examiner*—William Grant
*Assistant Examiner*—Steven R. Garland
*Attorney, Agent, or Firm*—Browdy and Neimark P.L.L.C

[57] ABSTRACT

Depending on the desired direction of current flux through an electrical load such as a stepped motor, in a measuring bridge circuit provided with switchable semiconductors and recovery diodes the semiconductors through which the current direction is switched are closed, causing the actual current to increase until it has attained the nominal current value, whereupon switching is effected into either slow current decay mode or fast current decay mode. A selection of the operating mode is made at the next semiconductor switch-on such that, if the actual current value is greater than the nominal current value at the next semiconductor switch-off, fast current decay mode is selected, and if the actual current value is lower than the nominal current value, slow current decay mode is selected. For the remainder of the chopper period, for example until the next switch-on, the operating mode is no longer changed, or switching is effected once from fast current decay mode into slow current decay mode, as a function of a comparator device that compares actual current values and nominal current values, if the actual current value is lower than the nominal current value. The invention can be used in actuation electronics for stepped motors.

9 Claims, 5 Drawing Sheets

METHOD OF CONTROLLING A CHOPPER DRIVER AND A CIRCUIT ARRANGEMENT FOR EXECUTING THE METHOD

FIELD OF THE INVENTION

The invention relates to a method of controlling a chopper driver.

REVIEW OF THE RELATED TECHNOLOGY

Electrical loads, particularly stepped motors, are frequently operated with so-called bridge circuits as their actuation electronics. A bridge circuit of this type can be constructed in the manner of the known Wheatstone bridge, which has a DC voltage source in one branch and a load in another branch. Instead of ohmic resistors, the resistance branches respectively include a semiconductor, for example a transistor, MOSFET or the like, that can be switched by a control signal. (For the sake of simplicity, the general term "switchable transistor" is used for all switchable semiconductors in the following description.) A known bridge circuit, also referred to as an H-bridge circuit, for controlling a chopper driver is shown in FIG. 1, and is described below with respect to its function.

In the H-bridge circuit shown in FIG. 1, one feed branch includes a DC voltage source V1, and the four resistance branches include the collector-emitter paths C–E of four transistors T1 through T4, which can be switched by a control signal, and a load branch (measurement branch) includes an electrical load L1 having an inductive component, and a measurement resistor R_mess, which is connected in series with this load. The load L1 having an inductive component can be formed by a stepped motor, for example. A current flows through such a load L1 due to corresponding switching of the transistors T1 through T4 with the aid of the control signals.

If the transistors T1 and T4 disposed in two bridge branches that are diagonal with respect to one another are closed, that is, in the conducting state, the current flows in a path 1, as indicated by a dashed line in FIG. 1. If the current is driven in the opposite direction through the load L1 having an inductive component, the two transistors T2 and T3 in the two other, diagonal bridge branches are to be closed by the control signals, that is, switched into the conducting state. The two other transistors (in the first case, transistors T2 and T3, and transistors T1 and T4 in the second case) are open in the two switched current-flux directions, i.e., they are switched in the non-conducting state.

In loads L1 having an inductive component, for example motors, a problem that arises when a transistor pair is switched off is that the current flux cannot be abruptly cut off because of the inductive component of the load L1 and the associated magnetic energy. So-called free-wheeling arms equipped with diodes (recovery diodes) D1 through D4 in accordance with FIG. 1 must be installed to protect the transistors T1 through T4 against overvoltage. The diodes D1 through D4 in the freewheeling arms are switched in parallel to the collector-emitter paths C–E of the transistors T1 through T4, and are poled such that their direction of current flux is respectively opposite the direction of current flux of the associated transistors T1 through T4.

The following is a description of two operating modes involved in the switching off of transistors. In so-called free-wheeling operation (slow current decay mode), only one transistor is opened during the switch-off. If, according to the example in FIG. 1, the current first flows as shown by the dashed-line path 1, either the transistor T1 or the transistor T4 is opened in this operating mode, i.e., it is switched into the non-conducting state. The current then flows according to the path 2 (via the diode D3 and the transistor T4) or according to the path 3 (via the diode D2 and the transistor T1). The magnetic energy from the inductive load L1, and thus the current, decay only very slowly via the recovery diodes D3 and D2, respectively, and the transistors T4 and T1, respectively.

In so-called regenerative operation (fast current decay mode), the two switched-on transistors are opened during switch-off. If, according to the example in FIG. 1, the current first flows as shown by the dashed-line path 1, both transistors T1 and T4 are opened in this operating mode, i.e., they are switched into the non-conducting state. In the load L1 with its inductive component, the stored magnetic energy flows as a current, back into the supply-voltage source V1 via the two recovery diodes D2 and D3. This current path is indicated as the path 4 in FIG. 1. The decay of the magnetic energy, and thus the decay of the current, occur very quickly because the supply voltage of the source V1 is much higher than the two conducting-state voltages of the recovery diodes D2 and D3.

Chopper drivers are frequently switched on and off. Here the properties of the entire system can be heavily influenced by the selection of the free-wheeling arm.

In known chopper drivers, the actual current through the load (in FIG. 1, the load L1 having an inductive component) is measured by a measuring resistor, for example the measuring resistor R_mess included in the bridge circuit of FIG. 1. If this actual current attains the predetermined nominal current, the driver switches into the slow current decay mode or the fast current decay mode, depending on the embodiment. After a predetermined time period (chopper period), the transistors are closed again, and the nominal value/actual value comparison begins again.

Conventional chopper drivers, such as the chopper driver 3952 (Full-Bridge-PWM Motor Driver) by Allegro Micro Systems, offer the user the option of freely selecting between the slow current decay mode and the fast current decay mode.

Intelligent chopper driver circuits, such as the PBM 3960 (Microstepping Controller), switch from slow current decay mode to fast current decay mode, depending on a settable nominal current value.

In the known chopper driver circuits, the selection of the operating mode (slow current decay mode or fast current decay mode) is essentially left to the user. Because the ideal operating mode is determined by numerous factors, for example the type of load (motor) and the stress, it is virtually impossible to attain optimum operating capacity. Due to the number of influences, the user frequently sets either slow current decay mode or fast current decay mode, which in no way creates optimum operating conditions.

CH 438 464 discloses a control method for a pulse rectifier that has a DC voltage in the one bridge diagonal, and a motor as an inductive load and a measuring resistor in the other bridge diagonal. Switching takes place between driving voltage, slow current decay mode and fast current decay mode to regulate the current. Switching is effected depending on the current when predetermined nominal-value limits are reached. During operation, switching is effected between driving voltage and slow current decay mode with a small counter-EMF within predetermined limits, and between slow current decay mode and fast current decay mode with a large counter-EMF within other predetermined limits. In this type of switching, there are no cycles of fixed period length.

U.S. Pat. No. 5,428,522 discloses a similar method. Here the nominal current is sinusoidal. In the periods of increasing current, switching is effected between driving voltage and slow current decay mode. During the periods of decaying current, switching is effected between the free-wheeling and modes of FIGS. 3 and 4. The switching during these periods is effected with time control, namely with clock pulses, and with fixed switching periods.

Switching from a period of increasing current into a period of falling current is effected through a comparison of the current with a nominal current value.

SUMMARY OF THE INVENTION

It is the object of the invention to provide a method of controlling a chopper driver with which the optimum operating mode can be set automatically and existing measuring systems can be utilized.

In accordance with the invention, in a magnetization phase, depending on the desired direction of current flux through the load having an inductive component, namely the provided semiconductors such as transistors, MOS FETs or the like, the semiconductors are switched on, that is, they are in the conducting state. In the example of a chopper driver having an H-bridge circuit according to FIG. 1, these semiconductors are the transistors T1 and T4, for example, for a current whose flux corresponds to the dashed-line path 1. The two other semiconductors, namely the transistors T2 and T3, are blocked for this direction of current flux, that is, non-conducting.

The current increases until the actual value attains the nominal value. At this point, in a demagnetization phase, switching is effected into either the slow current decay mode or the fast current decay mode. The operating mode is selected as a function of a current comparison at the next switch-on of the semiconductor (transistor). If the actual current value is still higher than the nominal current value, the fast current decay mode is selected at the next switch-off. If the actual value is lower than the nominal current value, the slow current decay mode is selected accordingly.

For the remainder of the chopper period, that is, until the next switch-on, it is possible to:

a) no longer change the operating mode, b) switch modes as a function of the current-comparison device, c) switch from fast current decay mode to slow current decay mode once if the nominal value is not attained.

Numerous experiments and measurements have revealed that c) yields the best results under normal operating conditions with the use of different stepped motors having a wide variety of stresses.

The method of the invention ensures that the optimum operating mode will be selected regardless of which load having an inductive component is used, i.e., the stepped motor used, and the stress. No additional electronic components are required for executing the method of the invention, because the actual value/nominal value comparator device is required anyway.

The use of the method of the invention therefore creates, without additional costs and further equipment, a system possessing clearly superior properties over the known chopper drivers, in which drive units provided with stepped motors can be subjected to interfering operating imbalances or even vibrations because of the non-optimum actuation.

BRIEF DESCRIPTION OF THE DRAWING

The above and other objects and the nature and advantages of the present invention will become more apparent from the following detailed description of an embodimet taken in conjunction with drawings, wherein.

DETAILED DESCRIPTION OF THE PREFERRED EMBODIMENT

Figure 1:
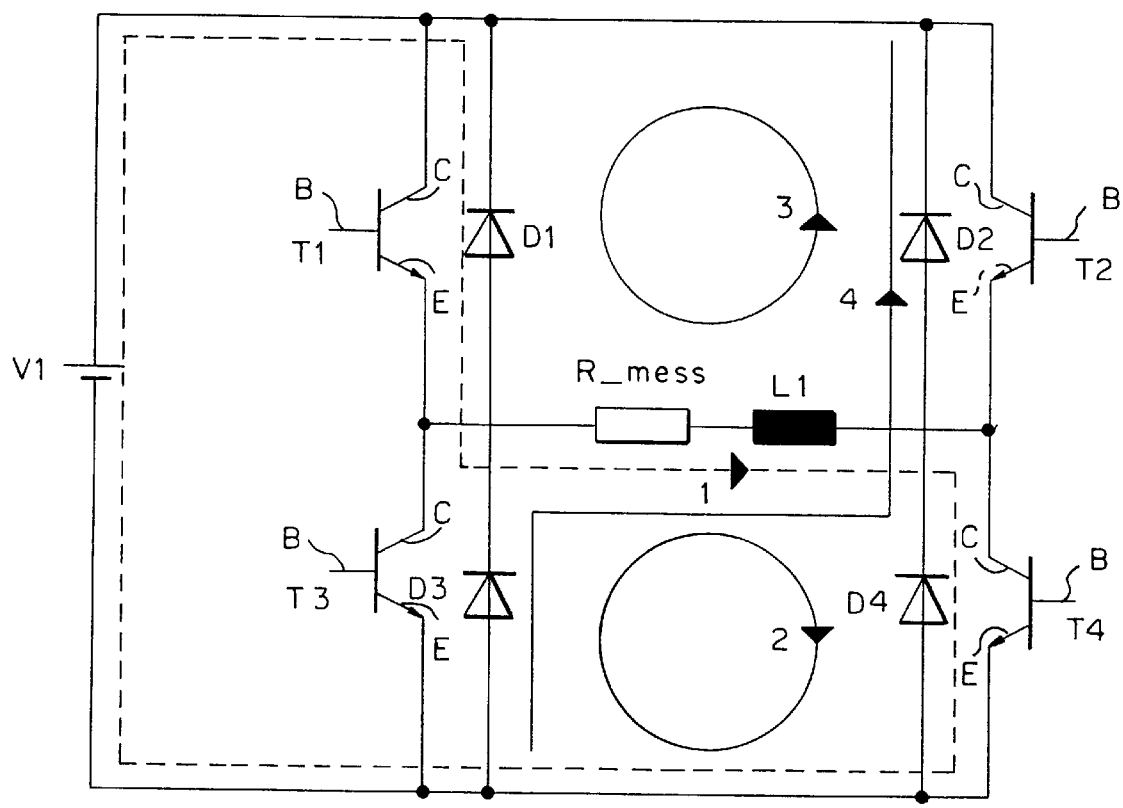
FIG. 1, labeled "prior art", is a schematic view of a bridge circuit described above in connection with the prior art, which can also be used as a basis for the chopper control method of the invention.
Figure 2:
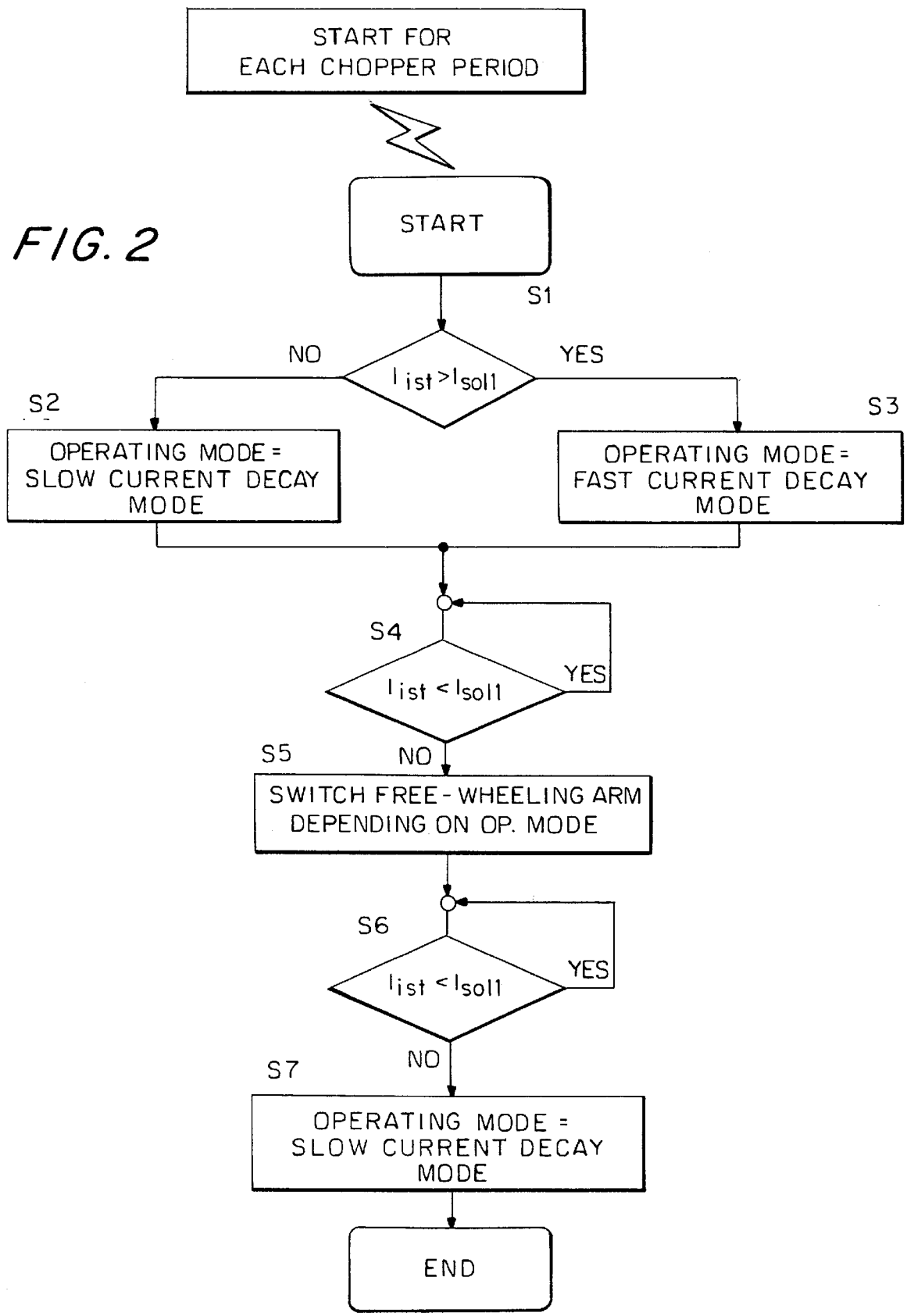
FIG. 2 is a flow chart illustrating the method of the present invention.

The flow chart example shown in FIG. 2 proceeds from the start for each chopper period, and shows the progression of the individual logical steps to the end of the chopper period in the method of the invention. After the start, in each Step S1 it is decided each time whether the actual current value $I_{ist}$ is larger than the nominal current value $I_{soll}$. The actual current value $I_{ist}$ might be measured, for example, by the voltage drop over the resistor R_mess of FIG. 1. The nominal current value $I_{soll}$ is a predetermined, not a measured, quantity.

If the decision is "no," an operating mode that corresponds to slow current decay mode is selected in Step S2. If the decision is "yes" in Step S1, an operating mode that corresponds to a fast current decay mode is selected in Step S3.

A decision that corresponds to Step S1 is reached in the next step, S4. If the decision is yes in Step S4, then Step S4 is repeated, as can be seen from the flow chart. If the decision in Step S4 is no, the freewheeling arm is switched in Step S5, depending on the operating mode. In the next step, S6, with the decision of "yes," Step S6 is repeated, corresponding to the procedure in Step S4, while with the decision of "no," Step S7 is performed, in which the operating mode is identical to slow current decay mode. The procedure for the next chopper period is subsequently started.

Figure 3:
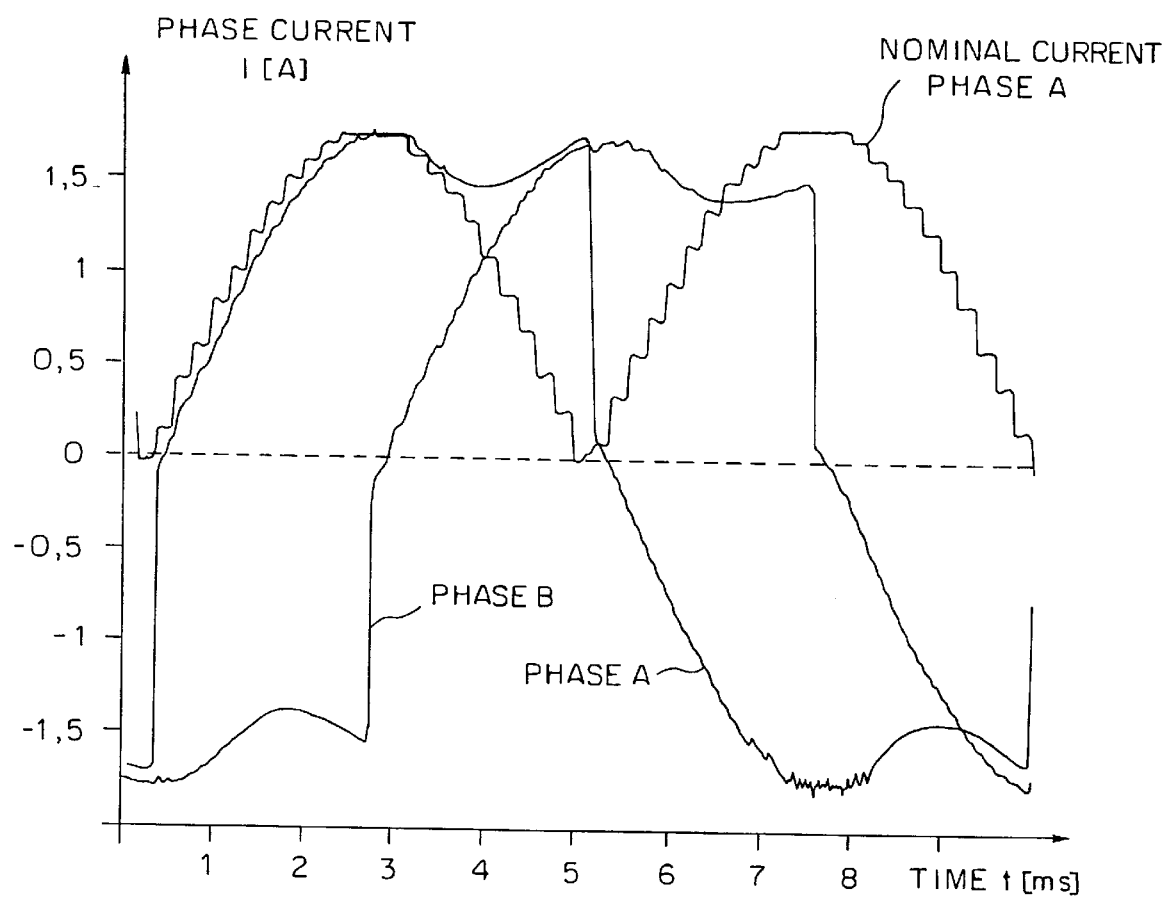
FIG. 3, labeled "prior art", is a graphical view or current/time diagram representing results for a continuous, fixed setting of simple slow current decay mode (FIG. 3)
Figure 4:
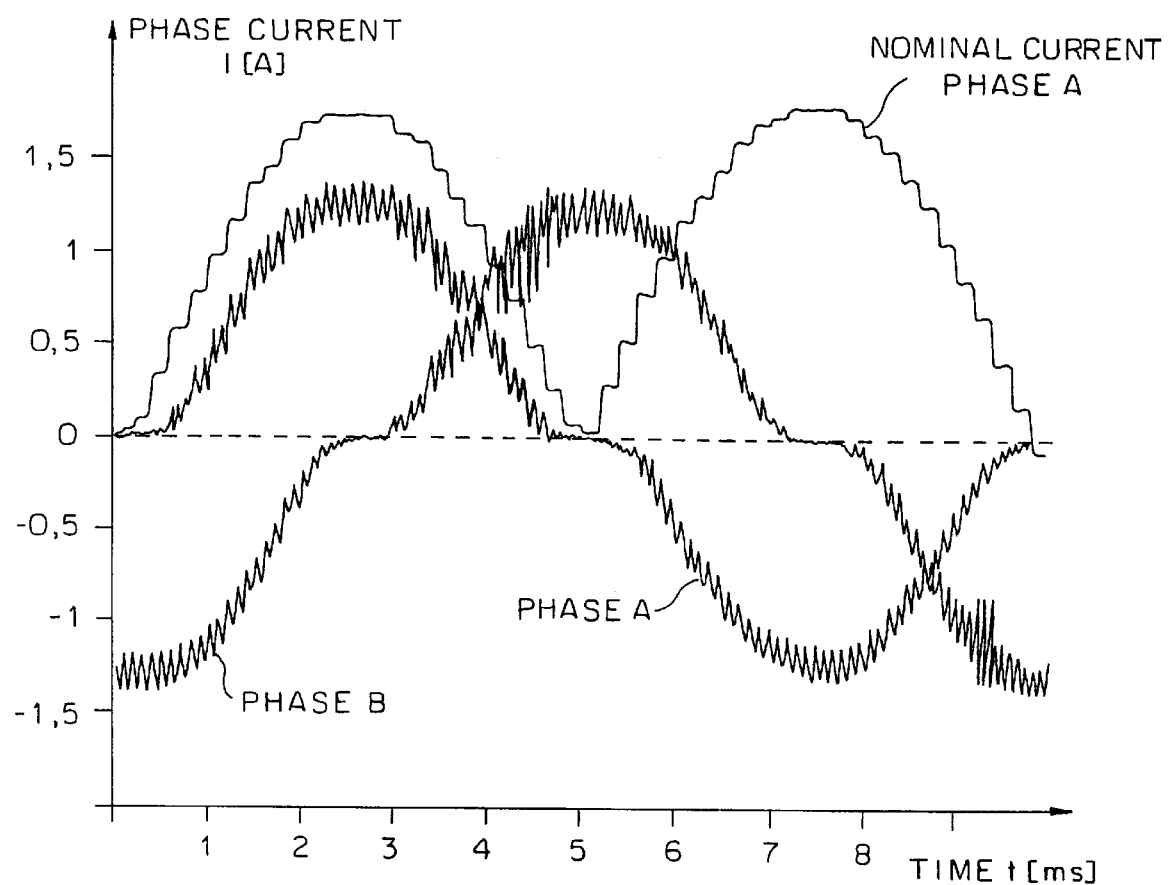
FIG. 4, labeled "prior art", is a graphical view or current/time diagram representing results for a continuous, fixed setting of simple fast current decay mode.
Figure 5:
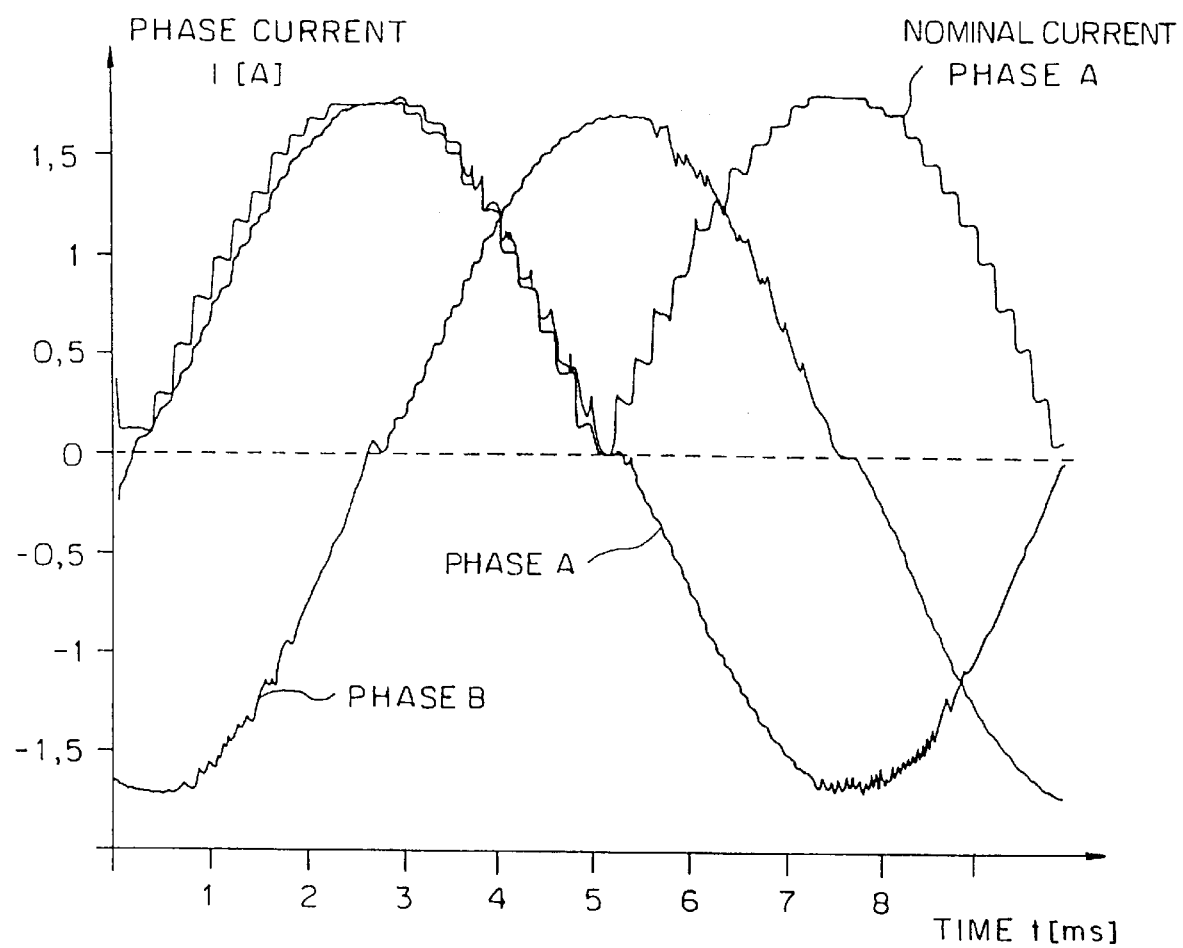
FIG. 5 is a graphical view or current/time diagram representing results for an automatic selection of the operating mode corresponding to the method of the invention.

FIGS. 3 through 5 respectively show time t in milliseconds (ms) on the abscissa, and a phase current I in amperes (A) on the ordinate.

In the current (phase current)/time diagrams of FIGS. 3 through 5, the function and operation of the chopper control method of the invention are shown by way of a stepped-motor embodiment, with a display of results for comparison to the methods that employ a fixed switch-off operating mode (slow current decay mode or fast current decay mode).

Here, FIG. 3 shows the result for a continuous, fixed setting of simple slow current decay mode, FIG. 4 shows the result for a continuous, fixed setting of simple fast current decay mode, and FIG. 5 shows the result for an automatic selection of operating mode corresponding to the method of the invention.

In the slow current decay mode shown in FIG. 3, the actual current (phase A, phase B) decays very slowly. At higher motor rpms, the chopper period of the nominal phase current (nominal current phase A) is smaller than the pulse-decay time constant, so the phase current (phase A, phase B) cannot decay sufficiently quickly within a period. The current even increases again here due to the counter-EMF (Electro-Motive Force).

In the fast current decay mode shown in FIG. 4, the course of the actual current (phase A, phase B) is no longer greater than the nominal phase current (nominal current phase A). However, the clearly-visible current ripple (the significantly-fluctuating current amplitude) is undesirable, and can interfere significantly with the mechanics driven by the motor.

In the automatic selection shown in FIG. 5, it can be seen that the actual current (phase A, phase B) optimally follows the predetermined nominal current (nominal current phase A) corresponding to the control method of the invention, with a one-time switch from slow current decay mode into fast current decay mode when the actual value is lower than the nominal value.

The method of the present invention includes providing a computer system including a program (executable instructions for carrying out the steps of the method) directing the computer to carry out the steps of the invention. The program may include the comparator and direct the apparatus to carry out the steps of the method. The program will ordinarily be in computer's memory, retrieved from a transportable storage medium on which it was stored.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist carries out the recited function, whether or not precisely equivalent to the embodiment or embodiments disclosed in the specification above; and it is intended that such expressions be given their broadest interpretation.

What is claimed is:

1. A method for controlling a chopper driver coupled between a voltage source (V1) and a load (L1) having an inductive component;

wherein the chopper driver includes:

a bridge circuit having diagonals and branches and further comprising a first bridge diagonal of the bridge circuit having therein the voltage source, a second bridge diagonal of the bridge circuit having therein the electrical load, and semiconductors (T1–T4) being disposed in the branches;

the semiconductors being switchable on and off by a control signal (B), so as to make an actual current ($I_{ist}$) flow in either of two directions through the load;

emitter-collector paths of the semiconductors being bridged by free-wheeling arms further comprising recovery diodes (D1–D4) for protection against overvoltage;

the recovery diodes permitting either one of a slow current decay mode including a very slow decay of magnetic energy of the load and the actual current, and a fast current decay mode including a rapid decay of the magnetic energy of the load and the actual current, through switching off of individual semiconductors in the bridge branches;

the method comprising:

providing a device (R_mess) for measuring the actual current ($I_{ist}$) flowing through the load, the device being connected in series with the load;

providing a comparator for making a determination, over a course of each chopper period, whether the measured actual current has attained a predetermined nominal current value ($I_{soll}$)

selecting between the slow current decay mode and the fast current decay mode as a function of the determination; the step of selecting further comprising:

during a magnetization phase, switching on semiconductors, through which the current direction is switched, depending on a desired current flux direction through the load and allowing the actual current to increase until it has attained the nominal current value; and, in a subsequent demagnetization phase, switching into either the slow current decay mode or the fast current decay mode according to a comparison made shortly before, during, or shortly after a last semiconductor switch-on, such that the fast current decay mode is selected if the actual current was higher than the nominal current value, and the slow current decay mode is selected if the actual current value was lower than the nominal current value.

2. The method according to claim 1, wherein a selected mode is not changed for a remainder of the chopper period or until a next switch-on.

3. The method according to claim 1, wherein mode selection is effected as a function of the comparator for a remainder of the chopper period or until a next switch-on.

4. The method according to claim 1, wherein changing from fast current decay mode to slow current decay mode is effected once during remainder of the chopper period or until the next switch-on, if the actual current is lower than the nominal current value.

5. The method according to claim 1, including providing a stepped motor as the load.

6. The method according to claim 1, comprising providing a computer system including a program, the program comprising the comparator and adapted for carrying out the steps of the method for controlling a chopper driver coupled between a DC voltage source (V1) and a load (L1) having an inductive component.

7. The method according to claim 6, comprising a step of providing a computer memory encoded with executable instructions for carrying out the steps of the method.

8. The method according to claim 6, including a step of storing the program on a transportable storage medium.

9. The method according to claim 6, including a step of retrieving the program from a transportable storage medium.

* * * * *